United States Patent [19]

Schabert et al.

[11] Patent Number: 5,345,835
[45] Date of Patent: Sep. 13, 1994

[54] FITTING FOR SHUTTING OFF A FLOW

[75] Inventors: Hans-Peter Schabert, Erlangen; Erwin Laurer, Möhrendorf, both of Fed. Rep. of Germany

[73] Assignee: Siemens Aktiengesellschaft, Munich, Fed. Rep. of Germany

[21] Appl. No.: 8,462

[22] Filed: Jan. 25, 1993

[30] Foreign Application Priority Data

Jul. 25, 1990 [DE] Fed. Rep. of Germany ....... 4023636

[51] Int. Cl.$^5$ .............................................. F16H 1/18
[52] U.S. Cl. .................... 74/424.8 VA; 192/141; 251/129.11
[58] Field of Search .................... 74/411.5, 424.8 VA; 192/7, 141, 143; 251/129.11, 129.12, 129.13

[56] References Cited

U.S. PATENT DOCUMENTS

| | | | |
|---|---|---|---|
| 3,327,826 | 6/1967 | Henschke | 74/424.8 VA X |
| 3,802,281 | 4/1974 | Clarke | 192/7 X |
| 4,063,707 | 12/1977 | Zouzoulas | 74/424.8 VA X |
| 4,120,596 | 10/1978 | Kunkle | 74/424.8 VA X |
| 4,627,461 | 12/1986 | Gordon | 74/424.8 VA X |
| 4,751,988 | 6/1988 | Metcalf | 192/141 X |
| 4,770,390 | 9/1988 | Tratz et al. | |

FOREIGN PATENT DOCUMENTS

| | | |
|---|---|---|
| 0193775 | 2/1989 | European Pat. Off. . |
| 2606440 | 9/1976 | Fed. Rep. of Germany . |
| 3314781 | 10/1984 | Fed. Rep. of Germany . |
| 2240398 | 3/1975 | France . |
| 8703659 | 6/1987 | World Int. Prop. O. . |

OTHER PUBLICATIONS

International Search Report.

Primary Examiner—Rodney H. Bonck
Assistant Examiner—David W. Laub
Attorney, Agent, or Firm—Herbert L. Lerner; Laurence A. Greenberg

[57] ABSTRACT

A fitting, in particular for shutting off a flow, includes a housing. A fixed threaded part is axially displaceable and fixed against relative rotation in the housing. A rotatable threaded part is axially resiliently and rotatably supported in the housing. A braking device has at least two friction surfaces facing toward one another and being pressed against one another with a braking force if a predetermined rated force upon the fixed threaded part is exceeded, in order to brake a rotary motion of the rotatable threaded part through an axial displacement and form a braking surface. One of the friction surfaces is connected to and fixed against rotation relative to the rotatable threaded part. A cup spring assembly has a width, an intermediate radius and at least one cup spring for resiliently supporting the rotatable threaded part in at least one axial direction. The braking force relative to the width of the cup spring assembly is introduced over the intermediate radius of the cup spring assembly.

25 Claims, 5 Drawing Sheets

FITTING FOR SHUTTING OFF A FLOW

CROSS-REFERENCE TO RELATED APPLICATION

This application is a Continuation of International Application Ser. No. PCT/DE91/00600, filed Jul. 24, 1991.

BACKGROUND OF THE INVENTION

Field of the Invention

The invention relates to a fitting or a valve, in particular for shutting off a flow, including a threaded part being axially displaceable and fixed against relative rotation in a housing, a threaded part being axially resiliently and rotatably supported in the housing, a braking device having at least two friction surfaces facing toward one another, being pressed against one another with a braking force in order to brake the rotary motion of the rotatable threaded part by means of an axial displacement and form a braking surface, if a predetermined rated force upon the threaded part being fixed against relative rotation is exceeded, one of the friction surfaces facing toward one another being connected to the rotatable threaded part in such a manner as to be fixed against relative rotation, and a cup spring assembly having at least one cup spring for resiliently supporting the rotatable threaded part in at least one axial direction.

Fittings for shutting off a flow often have an axially displaceable spindle that is provided with a closure piece, such as a valve cone or valve plate, and which is moved by a spindle nut being rotatably supported in a housing. As the closure piece moves into the seat, a predetermined torque is necessary. That torque depends on the designated pressure in the flow to be shut off, on the spindle geometry, and on the coefficient of friction in the spindle nut thread. In the case of a high-pressure valve with a rated width of 25 mm, for instance, a rated torque value (minimum value) of approximately 30 Nm is typical. However, after a long period of service, corrosion can considerably increase the coefficients of friction in the spindle nut thread. Correspondingly higher torques, for instance approximately 80 Nm, are then necessary to loosen the spindle nut.

In that case, an actuator for the fitting must be constructed in such a way that it can bring such a high loosening moment to bear even under unfavorable operating conditions. In the case of an electric motor actuator, by way of example such a moment may be a low supply voltage resulting from fluctuations in the mains voltage. However, at high mains voltage, with a cold winding in the electric motor, a positive motor production tolerance, and high fitting rigidity, the actuator can develop a much higher torque if it is not turned off as a function of torque. If there is an unfavorable cooperation among all of the tolerances, this torque can rise to 300 Nm, for instance. If the torque-dependent shutoff fails, then in an unfavorable case a torque can occur that is ten times the rated torque. The spindle is then severely overloaded and may buckle.

Published European Application No. 0 193 776 B1, corresponding to U.S. Pat. No. 4,770,390, discloses a fitting in which the torque made available by the actuator for generating a spindle force is already reduced during the adjusting motion. To that end, a brake bush is provided that is supported by slide surfaces on its ends on a brake housing and which, after an idle rotation angle of approximately 330°, is rotated along with the spindle nut. When the spindle nut is rotated backward again, the braking is omitted over the idle angle range, so that the torque generated by the actuator is fully available for loosening the spindle clamped in the nut thread. The braking moment created in the brake already becomes operative before the terminal position is reached and is proportional to the spindle force and to the coefficient of friction of the slide surfaces. By way of example, the brake can be constructed in such a way that as it moves into the terminal position it dissipates approximately 75% of the drive torque. Using the above numerical example, this means that the drive would have to be constructed not for a minimum torque of 30 Nm, but rather for one of 120 Nm. This makes it too expensive and too heavy in many cases. Moreover, the torques that arrive if shutoff fails under unfavorable conditions, are likewise correspondingly increased.

FIG. 4 of German Published, Non-Prosecuted Application 33 14 781 A1, corresponding to U.S. Pat. No. 4,546,281, discloses a fitting in which the spindle nut is additionally braked only after a predetermined spindle force is exceeded. This is achieved by supporting the spindle nut axially resiliently in the fitting housing and providing it with a runup ring which, if a predetermined spindle force is exceeded, is pressed against a brake bush being supported in the housing and including annular springs. As a result of the braking moment generated between the runup ring and the brake bushes, a braking action is generated so that only some of the torque made available by the drive becomes operative on the spindle. Such provisions lessen the load effectively on the spindle in the event of a so-called shutoff failure.

However, in that known fitting only some of the total spindle force becomes operational as a braking force that generates a braking torque. Under unfavorable conditions, the braking moment generated in this way may be inadequate to prevent an overload of the spindle.

It is accordingly an object of the invention to provide a fitting for shutting off a flow, which overcomes the hereinafore-mentioned disadvantages of the heretofore-known devices of this general type and which is a fitting with a braking device for controlling shutoff failure, in which the effective braking force in the braking device is as high as possible.

SUMMARY OF THE INVENTION

With the foregoing and other objects in view there is provided, in accordance with the invention, a fitting or a valve, in particular for shutting off a flow, comprising a housing; a fixed threaded part being axially displaceable and fixed against relative rotation in the housing; a rotatable threaded part being axially resiliently and rotatably supported in the housing; a braking device having at least two friction surfaces facing toward one another and being pressed against one another with a braking force if a predetermined rated force upon the fixed threaded part is exceeded, in order to brake a rotary motion of the rotatable threaded part by means of an axial displacement and form a braking surface, one of the friction surfaces being connected to and fixed against rotation relative to the rotatable threaded part; a cup spring assembly having a width, an intermediate radius and at least one cup spring for resiliently supporting the rotatable threaded part in at least one axial direction; and the braking force relative to the width of the cup spring assembly being introduced over the intermediate radius of the same cup spring assembly.

Once the braking device has become operative, at least two friction surfaces are pressed against one another and form a braking surface. One friction surface is connected to the rotatably supported threaded part in such a manner as to be fixed against relative rotation. Since a cup spring assembly containing at least one cup spring is provided for the resilient support of the rotatable threaded part in at least one axial direction, and the braking force, referred to the width of the cup spring assembly, is introduced over an intermediate radius of the same cup spring assembly, the cup spring assembly acts as a lever if a predetermined rated force is exceeded, and the total force acting upon the spindle becomes increasingly operative as the braking force, while there is simultaneous relief of the outer or inner radius of the cup spring assembly. As a result, while the total spindle force remains the same, the braking action is increased as compared with the known embodiments, and the danger of buckling of the spindle is reduced. Two braking devices according to the invention may also be provided in the fitting, in such a way that a braking action results for both directions of the stroke of the spindle.

The intermediate radius of the cup spring assembly can be varied in its size and in this way the total spindle force at which the load is completely taken over by the braking surface can be determined. The associated threshold value of the total spindle force accordingly becomes closer to the rated force, as the deviation of the intermediate radius from the inner radius of the cup spring assembly decreases. This is important whenever a thin spindle with low protection from buckling is used.

In accordance with another feature of the invention, the intermediate radius differs from the inner or outer radius by at least 20% of the width of the cup spring assembly.

In accordance with a further feature of the invention, a predetermined idle angle is provided for the rotational fixation of at least one of the two friction surfaces. If the rotatable threaded part is loosened, this friction surface is then not moved jointly during the rotary motion, within the idle angle. Accordingly, to loosen the rotatable threaded part, the braking force effective in the friction surfaces need not be brought to bear, but instead only the torque for loosening the thread and for the usual low-friction axial bearing of the rotatably supported threaded part is required. During the rotary motion of the rotatable threaded part in the idle angle range, the two friction surfaces are relieved, and the braking action between the two friction surfaces is cancelled either completely or in part.

In accordance with an added feature of the invention, the idle angle may be provided both for the friction surface connected to the housing in a rotationally fixed manner and for the friction surface connected to the rotatable threaded part in a rotationally fixed manner.

In accordance with an additional feature of the invention, the idle angle corresponds to a stroke of the spindle nut of approximately 0.3 mm and preferably approximately 0.01 mm.

In accordance with yet another feature of the invention, while the idle angle is being traversed, a low-friction bearing, in particular a roller bearing, provides for the transmission of the resultant braking force.

In accordance with yet a further feature of the invention, the friction surfaces are disposed on an end surface of a braking sleeve being axially displaceably disposed in the housing.

In accordance with yet an added feature of the invention, the friction surfaces that are connected in a rotationally fixed manner to the rotatable threaded part, are located on at least one brake ring being axially displaceably disposed on this threaded part.

In accordance with yet an additional feature of the invention, there is provided a brake ring which is axially displaceable, is connected in a rotationally fixed manner to the rotatable threaded part and is disposed between two axially displaceable brake sleeves that are connected to the housing in a rotationally fixed manner. As a result, two braking surfaces become operative, and the braking action is increased.

In accordance with again another feature of the invention, the brake rings are provided on their inner surfaces with at least three recesses for a driver tooth connected in a torque-locking manner with the rotatable threaded part.

In accordance with again a further feature of the invention, the recesses and the respective driver teeth assigned to them have oblique flanks.

This produces self-centering of the brake ring, so that it can be equipped with an adequate radial play with respect to the rotatably supported part. In accordance with again an added feature of the invention, the radial play is more than 0.02 m. The brake ring and the rotatably supported threaded part then do not touch one another as the idle angle is traversed.

In accordance with again an additional feature of the invention, the friction surfaces are provided with a friction lining that is highly effective even under lubricant.

In accordance with still another feature of the invention, the friction surfaces are provided with radial grooves that positively displace lubricant. As a result of these provisions, a braking action that is only slightly dependent on the lubricant state of the friction surfaces is attained.

In accordance with still a further feature of the invention, the mean distance between the friction surfaces and the center axis of the axially displaceable threaded part amounts to at least twice the flank radius of the thread. This provides an especially good braking action.

In accordance with still an added feature of the invention, the bearing of the rotatable threaded part and the gearing are combined in a common housing. This provides an especially space-saving configuration.

In accordance with still an additional feature of the invention, there is provided an axially displaceable toothed gearing, in particular a planetary gear, mounted on the rotatable threaded part, for driving the rotatable threaded part. This increases the proportion of the braking force in the total spindle force.

In accordance with another feature of the invention, the axially displaceable threaded part is a spindle or a nut, which in either case is rotatably fixed in the housing.

Reliable control in the event of electrical shutoff failure is attained particularly if the fitting according to the invention is provided with an actuator in which a higher torque is furnished upon movement outward from the terminal position, than upon movement inward into the terminal position. This is done by mechanical and/or electrical means as is disclosed, for instance, in Published European Application No. 0 193 776 B1, corresponding to U.S. Pat. No. 4,770,390. The opportunity then exists for further operation of the fitting after some disruption in control has been eliminated, without having to make a mechanical intervention.

Other features which are considered as characteristic for the invention are set forth in the appended claims.

Although the invention is illustrated and described herein as embodied in a fitting for shutting off a flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
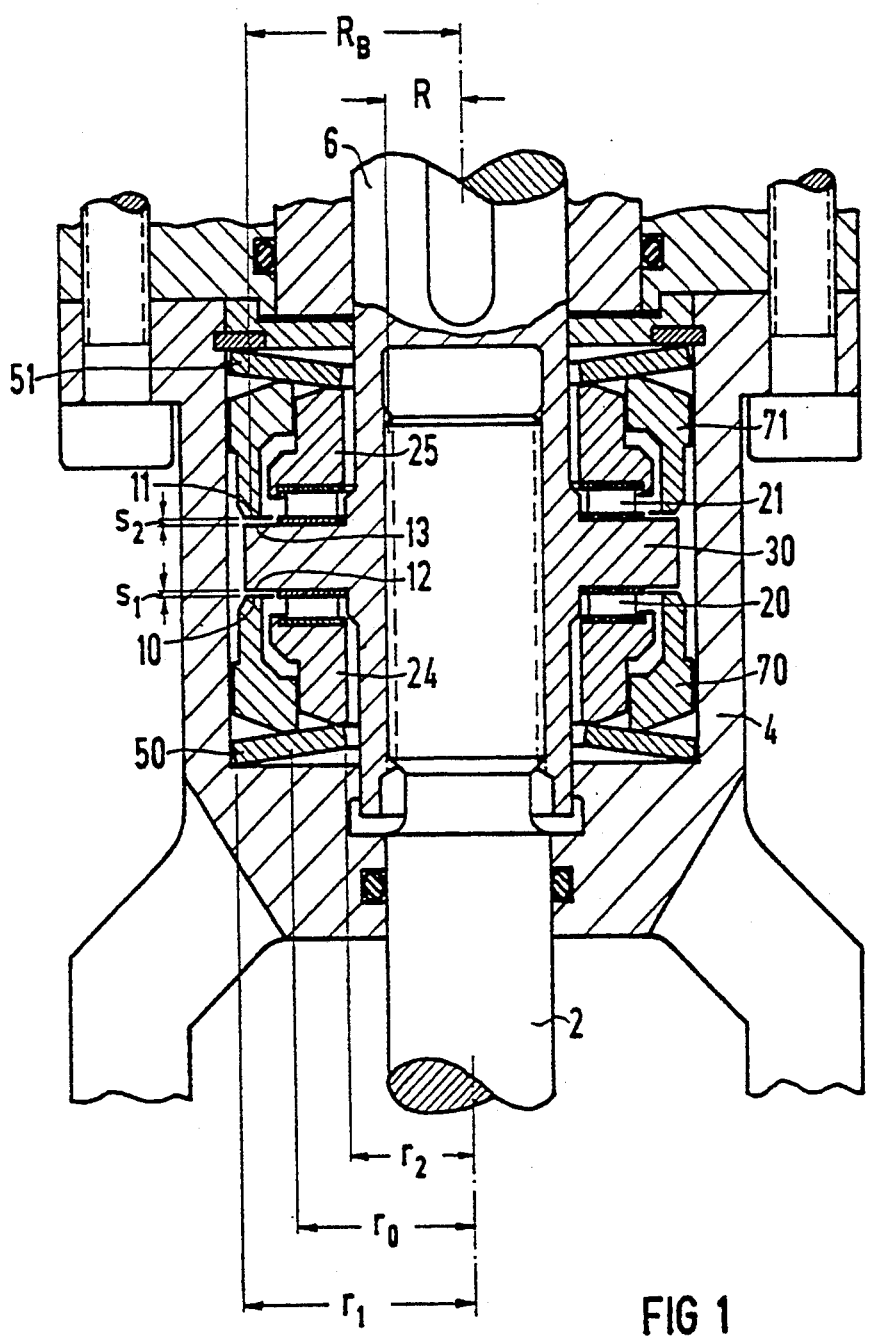
FIG. 1 is a fragmentary, diagrammatic, longitudinal-sectional view of a fitting according to the invention.

Referring now to the figures of the drawing in detail and first, particularly, to FIG. 1 thereof, there is seen a fitting or valve which includes a spindle 2 serving as a rotationally fixed threaded part, with a non-illustrated closure piece. The spindle is movable in the axial direction by a spindle nut 6 that is supported rotatably in a housing 4. The closure piece has two terminal positions, which it respectively reaches at a valve seat and at a rear seat.

The spindle nut 6 is provided with a brake ring 30, which is joined to it in an axially and rotationally fixed manner. The spindle nut 6 is supported on the brake ring 30 by roller bearings 20 and 21 and bearing bushes 24 and 25 as well as cup spring assemblies 50 and 51 in the housing 4. In the embodiment shown in the drawing, the cup spring assemblies 50 and 51 each include a single cup spring. However, a plurality of cup springs stacked in parallel and combined into an assembly could also be provided. The brake ring 30 has end surfaces with outer peripheral regions 12, 13 that are respectively associated with respective opposed end surfaces of brake sleeves 70, 71. In the illustrated embodiment, the brake sleeves 70 and 71 are not form-lockingly and rotationally fixed in the housing 4, but instead transmit their braking moment with friction locking, serving as a rotational fixation, to the cup spring assembly 50 and from there to the housing 4. A form-locking connection is one which connects two elements together due to the shape of the elements themselves, as opposed to a force-locking connection, which locks the elements together by force external to the elements. However, in one construction a rotational fixation for the brake sleeves 70 and 71, for example with adjusting springs, can be provided.

End surfaces 10 and 11 of the brake sleeves 70 and 71 and the end surfaces 12 and 13 of the brake ring 30 are constructed as annular friction surfaces. These friction surfaces 10–13 are preferably provided with a friction lining that positively displaces lubricant or with radial grooves that positively displace lubricant, so that a cohesive film of lubricant cannot form. The friction lining of the friction surfaces 12, 13 and 10, 11 present on the brake ring 30 and on the brake sleeves 70 and 71 are preferably formed of different materials, such as bronze and steel, respectively.

An amount of play $s_1$ and an amount of play $s_2$ that are approximately of equal magnitude in a force-free position of repose of the spindle 2, is established between the friction surfaces 12 and 13 of the brake ring 30 and the friction surfaces 10 and 11 of the brake sleeves 70 and 71. With the spindle nut 6 rotating and the spindle 2 being axially displaced, the plays $s_1$ and $s_2$ that are established depend on the spring stiffness of the cup spring assemblies 50 and 51 and on the braking moments caused by friction in the nut thread.

At the end of the travel of the spindle 2, once the closure piece has reached the valve seat, the force exerted on the spindle 2 rises sharply, and the spindle nut 6 begins to climb, counter to the spring action of a cup spring, for example with the spindle 2 moving downward counter to the spring action of the cup spring assembly 51, and the brake ring 30 moves upward. The spring force exerted by the cup spring assembly 51 is influenced by the position of the bearing surface of the bearing bush 24. In the embodiment illustrated in this drawing figure, this is located at the inner edge of the cup spring assembly 51, or in other words at a point where the spring stiffness of the cup spring assembly 51 is at its lowest. The play $s_2$ between the upper friction surface 13 of the brake ring 30 and the friction surface 11 of the brake sleeve 71 becomes less and vanishes at a given rated force upon the spindle 2, such as approximately 15 kN, which results substantially from the spring travel and the spring stiffnesses of the cup spring assemblies 50 and 51.

The friction surfaces 11 and 13 are then pressed against one another with an additional braking force, counter to the action of the cup spring assembly 51, and form a braking surface. An additional braking moment is thus created, which depends on a mean distance $R_B$ of the friction surfaces from the spindle axis, on the coefficient of friction of the braking surface formed by the friction surfaces 12 and 13, and on the proportion of the total spindle force that is passed to the cup spring assembly 51 through the brake sleeve 71. The force exerted by the brake sleeve 71 on the cup spring assembly 51 is introduced over an intermediate radius $r_0$, with respect to a width $r_1-r_2$ of the cup spring assembly 51 that is determined from inside and outside radii $r_2$ and $r_1$. The force exerted by the brake sleeve 71 is preferably introduced over the intermediate radius $r_0$ that meets the condition $r_1 - 0.2(r_1-r_2) \leq r_0 \leq r_2 + 0.2(r_1-r_2)$, and in particular at approximately $r_0 = (r_1+r_2)/2$. If $r_0 = (r_1+r_2)/2$, the spring stiffness is approximately twice as high as at the inner radius. Upon further rotation, the total spindle force then increasingly shifts to the middle radius as soon as the total force has reached twice the rated value, and the inner radius is approximately completely relieved in this example. The total force then acts upon the brake sleeve and is fully available for braking purposes.

Since the distance $R_B$ is greater than the flank or lateral surface radius R of the nut thread, an effective limitation of the axial force exerted by the drive upon the spindle 2 is achieved. The distance $R_B$ is preferably at least twice and in particular three times the flank radius R. As a result of this feature, if there is a shutoff failure of the drive, buckling of the spindle 2 is avoided. While the torque rises to ten times the rated value, for instance, the spindle force remains below approximately three times the rated value.

Figure 2:
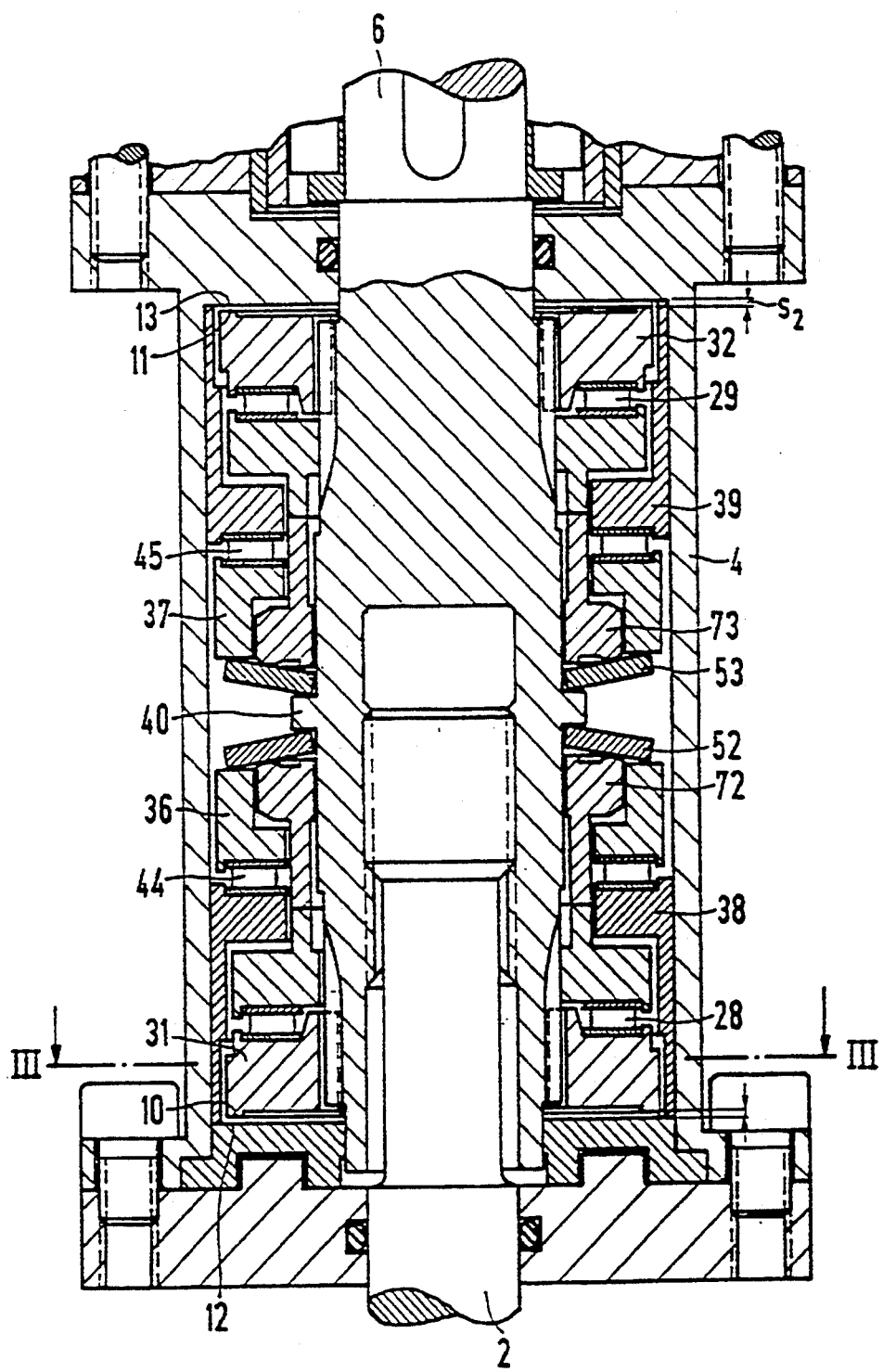
FIGS. 2 and 3 show another advantageous exemplary embodiment of a fitting in respective fragmentary, longitudinal-sectional and cross-sectional views.

In the embodiment of FIG. 2, the spindle nut 6 is provided with a driver flange 40, at which the spindle force is introduced through jointly rotating cup spring assemblies 52 and 53, pressure sleeve 36 and 37 and bearing bushes 38 and 39, into the housing 4. One respective roller bearing 44 and 45 is disposed between each of the pressure sleeves 36 and 37 and the bearing bushes 38 and 39. Two brake rings 31 and 32 are axially displaceably disposed on the spindle nut 6 and are roller-supported on respective axially displaceable intermediate sleeves 72 and 73. For assembly reasons, the intermediate sleeves 72 and 73 are each constructed as two rings that are mounted on one another. The brake rings 31 and 32 are preferably supported with low friction by respective roller bearings 28 and 29 with a predetermined radial play relative to the spindle nut 6. The brake rings 31 and 32 are provided with the respective annular friction surfaces 10 and 11 on the outer edges of their end surfaces facing toward a wall of the housing 4. The friction surfaces 12 and 13 are likewise provided on the surface regions of the wall of the housing 4 facing toward them.

The spindle 2, for instance while it is climbing upward, initially introduces the spindle force upon the pressure sleeve 37 through the cup spring assembly 53. In this process the braking ring 32 is displaced by the roller bearing 29 relative to the housing wall until the play $s_2$ vanishes. The intermediate sleeve 73, analogously with the exemplary embodiment of FIG. 1, likewise rests on a middle radius of the cup spring assembly 53. Once again, upon further rotation, the entire spindle force increasingly shifts to the braking surface formed by the friction surfaces 11 and 13, so that virtually all of the spindle force is available for the effective braking moment.

Figure 3:
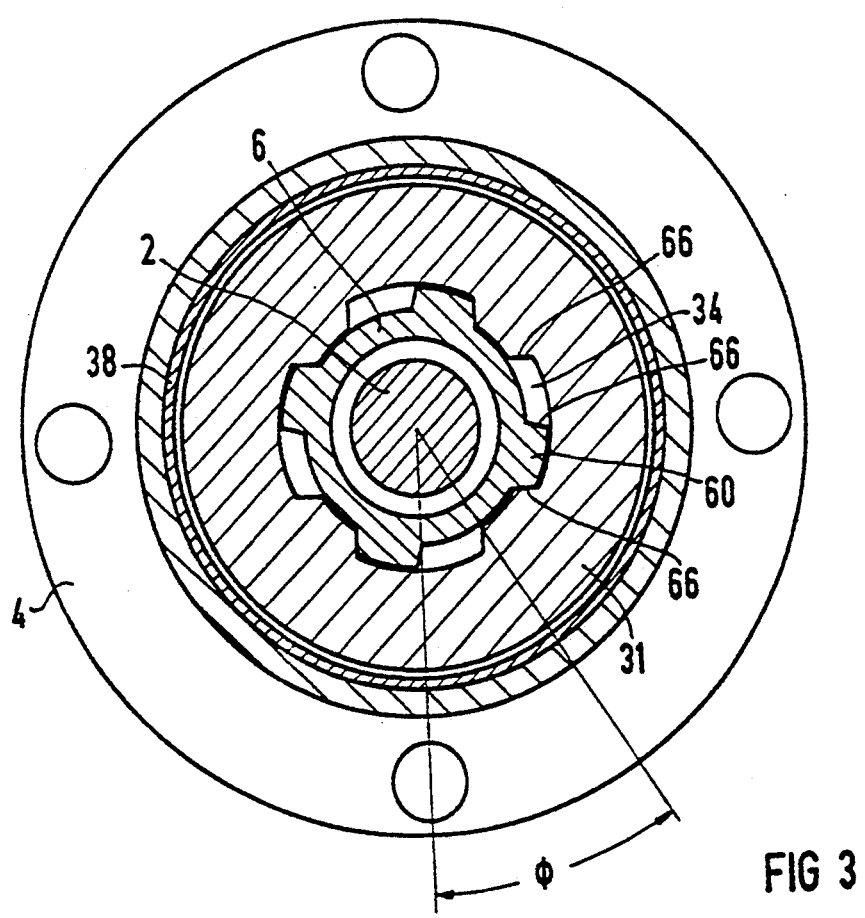

In FIG. 3, the spindle nut 6 is provided with four driver teeth 60, which engage corresponding recesses 34 in the brake ring 31. Once an idle angle $\phi$ has been traversed, flanks or lateral surfaces 66 of the driver teeth 60 and the brake ring 31 at the recess 34 touch, and a torque-locking connection results between the spindle nut 6 and the brake ring 31. This idle angle $\phi$ is at least large enough to ensure that the spindle stroke associated with it amounts to at least 0.01 mm. Preferably, an idle angle $\phi$ is provided that effects a spindle stroke of approximately 0.1 mm to 0.5 mm, for instance. In the case of a 24×3 nut thread (trapezoidal thread), this corresponds to an idle angle $\phi$ between 12° and 60°.

In order to loosen the spindle 2 from the terminal position, the rotary motion of the spindle nut 6 is reversed. Due to the available idle angle $\phi$ of the rotational fixation between the spindle nut 6 and the brake ring 31, the torque-locking connection between the spindle nut 6 and the brake ring 31 is released, and the entire drive torque is available for loosening the spindle 2 clamped in the nut thread. At the same time, the braking surface formed by the friction surfaces 10 and 12 in FIG. 2 is relieved by an axial motion of the spindle nut 6. Once the friction surface 10 in FIG. 2 is jointly rotated, after the traversal of the idle angle $\phi$, the braking action is cancelled out completely or predominantly, so that the torque available from the actuator is readily sufficient for the further rotation.

Figure 4:
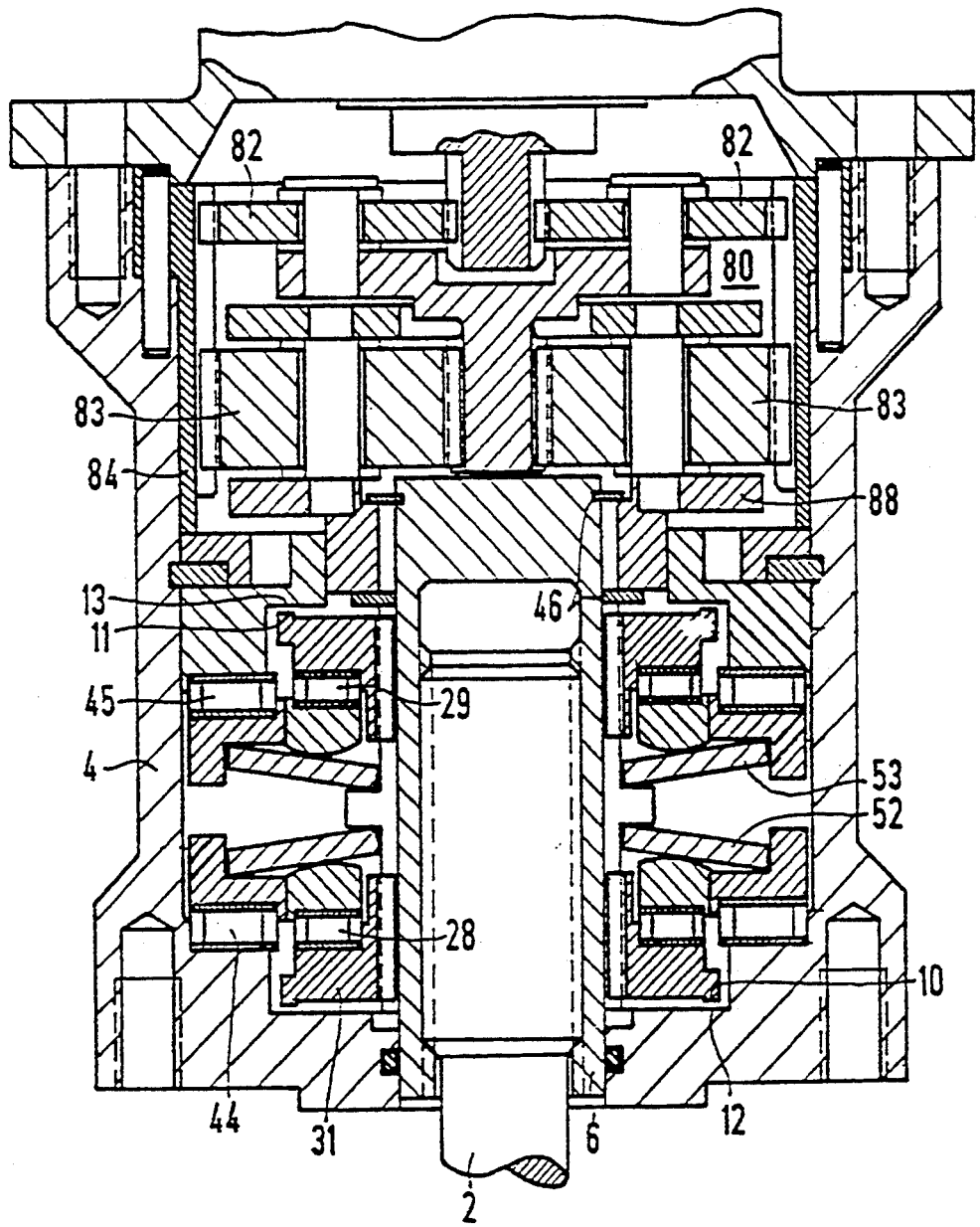
FIG. 4 is a fragmentary, longitudinal-sectional view of an especially compact embodiment with gearing integrated into a housing of the fitting.

In the exemplary embodiment of FIG. 4, the roller bearings or low-friction bearings 28 and 44 and the roller bearings or low-friction bearings 29 and 45, respectively, are disposed coaxially with one another in approximately the same plane. This feature produces a reduced structural height of the fitting.

In order to drive the spindle nut 6, a toothed-wheel gearing or transmission 80 with an axial play is disposed in the housing 4. In the exemplary embodiment, the toothed-wheel gearing 80 is a two-stage planetary gear with a ratio of i=b 64, having planet wheels 82 and 83 that revolve within a hollow ring 84. A planet wheel carrier 88 at the planetary gear is secured and axially and rotationally fixed on the spindle nut 6, with securing rings 46. The planet wheels 82 and 83 can move jointly with the spindle nut 6, under the load of the threaded spindle 2, in the axial direction in the context of the spring travel specified by the cup spring assemblies 52 and 53. That is, the axial sliding motion takes place with low friction between the teeth of the planet wheels 82 and 83 and of the hollow ring 84. A sliding connection with a groove and an adjusting spring that is otherwise conventional can accordingly be dispensed with. As a result of this feature, the proportion of the total spindle force that is effective as a braking force is further increased.

The drawings all show exemplary embodiments in which the spindle nut is rotatable in the housing and the spindle is rotationally fixed. However, the invention is also applicable to fittings in which the spindle, coming from above, is rotatable in a nut that is connected to the closure piece and is rotationally fixed in the housing. In that case, a bearing body at the upper end of the spindle takes the place of the spindle nut described in conjunction with the drawing figures.

Figure 5:
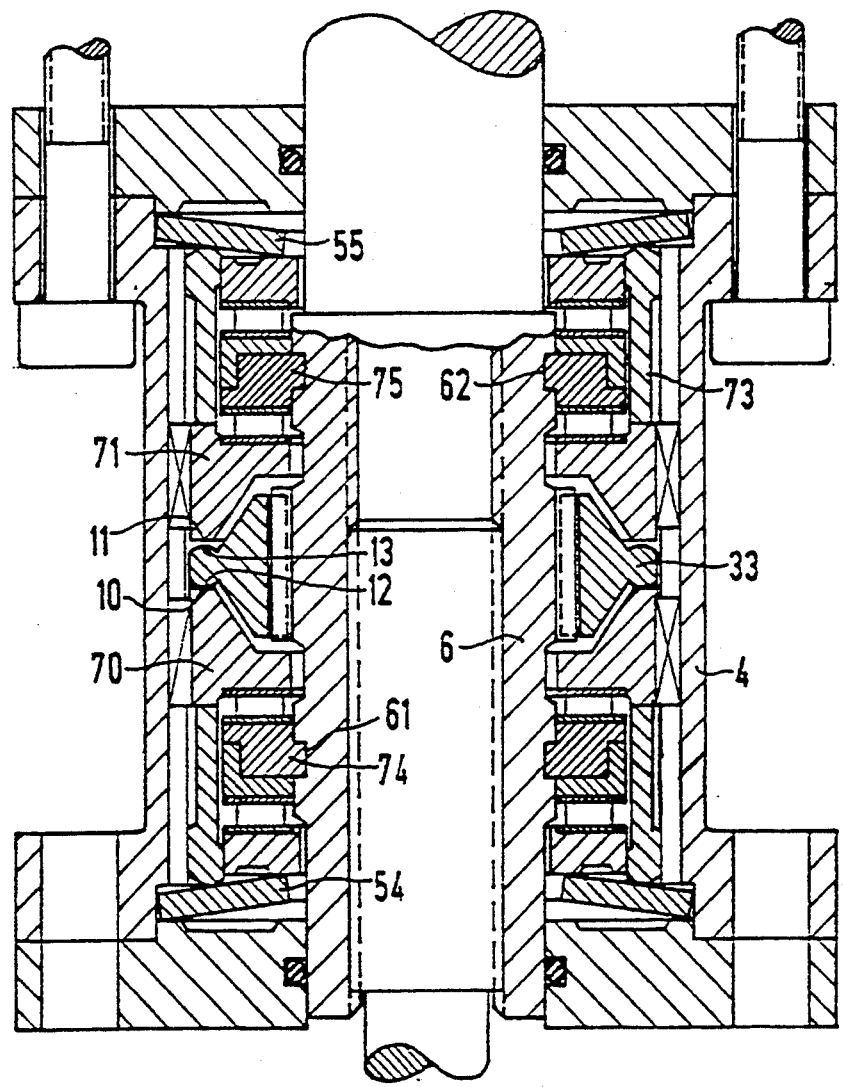
FIG. 5 is a fragmentary, longitudinal-sectional view of a further advantageous embodiment of a fitting according to the invention.

In the exemplary embodiment of FIG. 5, an axially displaceable brake ring 33 is provided on the spindle nut 6. The brake ring 33 is disposed between the two brake sleeves 70 and 71 and can rotate relative to the spindle nut 6 by a certain idle angle, such as 45°. These brake sleeves 70 and 71 are connected to the housing 4 in a rotationally fixed manner and are axially displaceably disposed in the housing 4. In order to increase the braking force, the brake ring 33 is provided with the friction surfaces 12 and 13 which are curved, so that upon contact with the friction surfaces 10 and 11 of the brake sleeves 70 and 71, a smaller effective braking surface area results.

Intermediate rings 74 and 75, which are axially fixed in grooves 61 and 62 and are constructed in multiple parts for assembly reasons, are disposed in the spindle nut 6. Through the use of these intermediate rings 74 and 75, the spindle nut 6 is supported rotatably and resiliently on both ends in the housing 4 by respective roller bearings and cup springs 54 and 55. With the spindle nut 6 climbing upward, for instance, the intermediate ring 74 carries the brake sleeve 70 through a roller bearing disposed between it and the brake sleeve 70, and by way of it the brake ring 33 is carried upward along with it, until the play between the brake ring 33 and the brake sleeves 70 and 71 vanishes. The brake force upon the two brake surfaces thus being formed is then introduced, beginning at the housing 4, through an intermediate radius of the cup spring 55 and the axially displaceable intermediate sleeve 73. In this exemplary embodiment, two effective brake surfaces are accordingly formed. As a result, the braking action is increased even further as compared with the exemplary embodiments of FIGS. 1–4.

In all of the exemplary embodiments, the friction surfaces may be conically constructed in order to increase the braking action. The inclination of the conical surface line is then preferably 35° to 40°. One of the conical friction surfaces that are oriented toward one another, for instance the friction surface disposed on the brake ring, is then preferably constructed to be hardened and smooth, while the friction surface opposite it is constructed in the shape of a diamond.

We claim:

1. Fittings for shutting off a flow, comprising:
   a housing;
   fixed threaded part being axially displaceable and fixed against relative rotation in said housing;
   a rotatable threaded part being axially resiliently and rotatably supported in said housing;
   a braking device having at least two friction surfaces facing toward one another and being pressed against one another with a braking force when a predetermined rated force upon said fixed threaded part is exceeded, in order to brake a rotary motion of said rotatable threaded part by means of an axial displacement and form a braking surface,
   one of said friction surfaces being connected to and fixed against rotation relative to said rotatable threaded part;
   a cup spring assembly having a radial width, an intermediate radius and at least one cup spring for resilient supporting said rotatable threaded part in at least one axial direction; and
   the braking force relative to the width of said cup spring assembly being introduced over the intermediate radius of said cup spring assembly.

2. The fittings according to claim 1, wherein said cup spring assembly has inside and outside radii, and the intermediate radius deviates by at least 20% of the width from one of the inside and outside radii.

3. The fittings according to claim 1, wherein the other of said friction surfaces facing said one friction surface being connected to and fixed against rotation relative to said rotatable threaded part, is locked to and fixed against rotation relative to said housing.

4. The fittings according to claim 1, wherein a predetermined idle angle is provided for fixation against relative rotation of at least one of said two friction surfaces facing toward one another.

5. The fittings according to claim 4, wherein the idle angle is provided for said friction surface being connected to and fixed against rotation relative to said rotatable threaded part.

6. The fittings according to claim 4, wherein the idle angle corresponds to a stroke of at least 0.01 mm in length of said rotatable threaded part.

7. The fittings according to claim 1, including a low-friction bearing for axial force transmission to said friction surfaces.

8. The fittings according to claim 7, wherein said low-friction bearing is a first low-friction bearing, and including a second low-friction bearing for supporting said rotatable threaded part in the same axial direction as said first low-friction bearing, said first low-friction bearing being disposed approximately in the same plane as said second low-friction bearing.

9. The fittings according to claim 1, including a brake sleeve being axially displaceable in said housing and having an end surface, the other of said friction surfaces facing said one friction surface being disposed on said end surface of said brake sleeve.

10. The fittings according to claim 1, including at least one brake ring being axially displaceably disposed on said rotatable threaded part, said one friction surface being connected to and fixed against rotation relative to said rotatable threaded part being disposed on said at least one brake ring.

11. The fittings according to claim 10, including a driver tooth disposed on said rotatable threaded part, said at least one brake ring having an inner surface with at least one recess formed therein for said driver tooth.

12. The fittings according to claim 12, wherein said rotatable threaded part and said at least one brake ring have a radial play of at least 0.02 mm therebetween.

13. The fittings according to claim 12, wherein said at least one recess is at least three recesses.

14. The fittings according to claim 13, including other driver teeth, each of said driver teeth being associated with a respective one of said recesses, and said at least one brake ring at said recesses and said driver teeth have oblique flanks.

15. The fittings according to claim 4, wherein the idle angle is provided for said friction surface being connected to and fixed against rotation relative to said rotatable threaded part.

16. The fittings according to claim 15, including a driver tooth disposed on said rotatable threaded part, said one brake ring having an inner surface with at least one recess formed therein for said driver tooth.

17. The fittings according to claim 16, wherein said rotatable threaded part and said brake ring have a radial play of at least 0.02 mm therebetween.

18. The fittings according to claim 16, wherein said at least one recess is at least three recesses.

19. The fittings according to claim 18, including other driver teeth, each of said driver teeth being associated with a respective one of said recesses, and said brake ring at said recesses and said driver teeth have oblique flanks.

20. The fittings according to claim 1, wherein said friction surfaces have a friction lining being effective with and without lubricant.

21. The fittings according to claim 1, wherein said fixed threaded part has a center axis and a thread with a given flank radius, and said friction surfaces and the center axis are spaced apart by a mean distance being at least twice the given flank radius.

22. The fittings according to claim 1, including an axially displaceable toothed-wheel gearing for driving said rotatable threaded part.

23. The fittings according to claim 22, wherein said toothed-wheel gearing is a planetary gear.

24. The fittings according to claim 1, wherein said fixed threaded part is a spindle.

25. The fittings according to claim 1, wherein said rotatable threaded part is a nut.

* * * * *